United States Patent
Ohno et al.

(10) Patent No.: US 10,904,433 B2
(45) Date of Patent: Jan. 26, 2021

(54) MULTI-VIEW OPTICAL SYSTEM, OPTICAL APPARATUS, IMAGING APPARATUS, AND MOVING BODY

(71) Applicant: Kabushiki Kaisha Toshiba, Minato-ku (JP)

(72) Inventors: Hiroshi Ohno, Tokyo (JP); Hiroya Kano, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/556,561

(22) Filed: Aug. 30, 2019

(65) Prior Publication Data

US 2020/0288058 A1 Sep. 10, 2020

(30) Foreign Application Priority Data

Mar. 8, 2019 (JP) .................. 2019-042723

(51) Int. Cl.
| | |
|---|---|
| *H04N 5/232* | (2006.01) |
| *G02B 27/28* | (2006.01) |
| *G02B 5/30* | (2006.01) |
| *H04N 13/282* | (2018.01) |
| *B60R 1/00* | (2006.01) |
| *B63B 49/00* | (2006.01) |
| *B64D 43/00* | (2006.01) |

(52) U.S. Cl.
CPC ....... *H04N 5/23238* (2013.01); *G02B 5/3025* (2013.01); *G02B 27/283* (2013.01); *H04N 13/282* (2018.05); *B60R 1/00* (2013.01); *B63B 49/00* (2013.01); *B64D 43/00* (2013.01)

(58) Field of Classification Search
CPC ............. H04N 5/23238; H04N 13/282; G02B 27/283; G02B 5/3025; B60R 1/00; B63B 49/00; B64D 43/00
See application file for complete search history.

(56) References Cited

U.S. PATENT DOCUMENTS

| | | | | |
|---|---|---|---|---|
| 10,146,055 B2 * | 12/2018 | Ouderkirk | ............ | G02B 27/017 |
| 10,303,306 B2 * | 5/2019 | Hasuike | ................ | G03B 21/00 |
| 2013/0010106 A1 * | 1/2013 | Yokota | .................. | G01C 3/085 |
| | | | | 348/135 |
| 2015/0172631 A1 * | 6/2015 | Kasahara | .................. | B60R 1/00 |
| | | | | 348/46 |
| 2015/0192758 A1 * | 7/2015 | Yamagata | .......... | G02B 13/0015 |
| | | | | 348/360 |
| 2015/0219919 A1 * | 8/2015 | Ouderkirk | ................ | B05D 1/18 |
| | | | | 359/489.09 |
| 2017/0208305 A1 * | 7/2017 | Kaneda | .................. | G03B 21/00 |
| 2018/0081163 A1 * | 3/2018 | Lin | ........................ | G02B 23/04 |

FOREIGN PATENT DOCUMENTS

JP 2003-339060 11/2003

\* cited by examiner

*Primary Examiner* — Shawn S An
(74) *Attorney, Agent, or Firm* — Oblon, McClelland, Maier & Neustadt, L.L.P.

(57) ABSTRACT

A multi-view optical system includes an optical element. The optical element is configured to direct, in a predetermined direction, a first polarization component of a light beam coming from a first visual field, and a second polarization component, which is different from the first polarization component, of a light beam coming from a second visual field different from the first visual field.

12 Claims, 9 Drawing Sheets

12
MULTI-VIEW OPTICAL SYSTEM, OPTICAL APPARATUS, IMAGING APPARATUS, AND MOVING BODY

CROSS REFERENCE TO RELATED APPLICATION(S)

This application is based upon and claims the benefit of priority from prior Japanese Patent Application No. 2019-042723, filed Mar. 8, 2019, the entire contents of which are incorporated herein by reference.

FIELD

Embodiments described herein relate generally to a multi-view optical system, an optical apparatus, an imaging apparatus, and a moving body.

BACKGROUND

Conventionally, it is common practice to use what is called a fisheye lens to obtain a wide-field image.

DETAILED DESCRIPTION

According to one embodiment, a multi-view optical system includes an optical element. The optical element is configured to direct, in a predetermined direction, a first polarization component of a light beam coming from a first visual field, and a second polarization component, which is different from the first polarization component, of a light beam coming from a second visual field different from the first visual field.

An objective according to one embodiment is to provide the multi-view optical system, an optical apparatus, an imaging apparatus, and a moving body configured to obtain a wide-field image.

Various embodiments will be described hereinafter with reference to the accompanying drawings.

The drawings are schematic or conceptual, and a relationship between the thickness and width of each part, a ratio of sizes between parts, and the like are not necessarily the same as the actual ones. Further, even in a case of representing the same portion, dimensions and ratios may be different from one another depending on the drawings. In the description of the present application and the drawings, the same elements as those described previously with reference to drawings described previously are denoted by the same reference numerals, and the detailed description of such elements will be appropriately omitted.

First Embodiment

A configuration of a wide-field imaging system 10 according to a first embodiment will be described with reference to FIGS. 1 to 3B.

Figure 1:
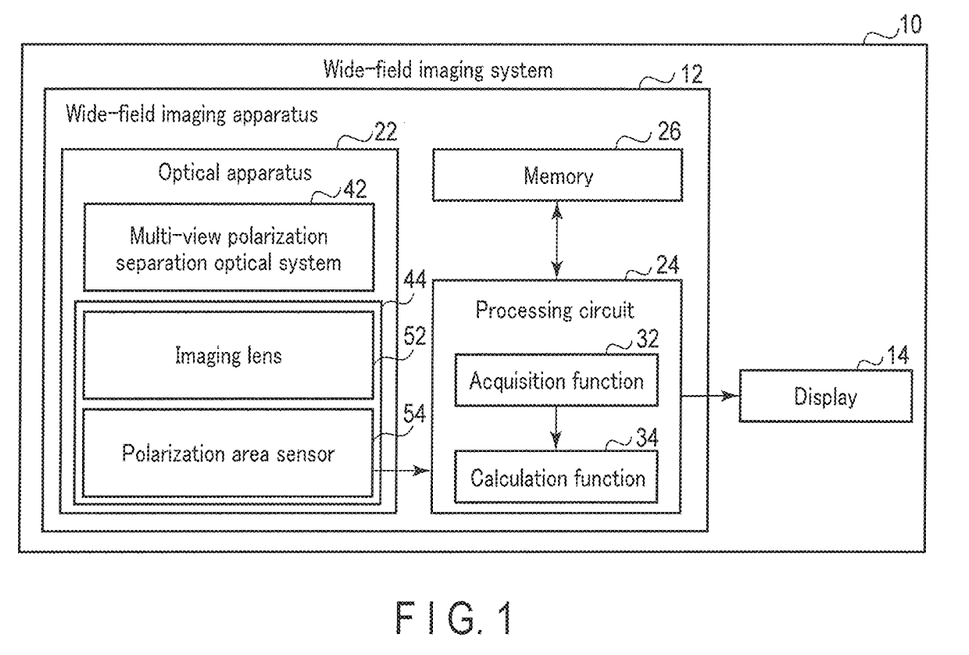
FIG. 1 is a schematic block diagram showing a wide-field imaging system according to a first embodiment to a fifth embodiment.

FIG. 1 is a block diagram showing an example of the configuration of the wide-field imaging system 10 according to the present embodiment. As shown in FIG. 1, the wide-field imaging system 10 includes a wide-field imaging apparatus 12 and a display 14. The wide-field imaging apparatus 12 includes an optical apparatus 22, a processing circuit (image signal processing circuit) 24, and a memory 26. The processing circuit 24 includes an acquisition function 32 configured to acquire acquired data (image data) acquired by a polarization area sensor 54 described later, and a calculation function 34 configured to calculate a value obtained by performing predetermined operation on acquired data acquired using the acquisition function 32. In the present embodiment, as an example, the processing circuit 24 controls the polarization area sensor 54 and also controls the display 14.

The display 14 can display output data from the processing circuit 24. Output of the processing circuit 24 includes, for example, an image based on acquired data (image data) acquired by the polarization area sensor 54, an operation screen, and the like. The display 14 is, for example, a liquid crystal display or an organic EL display. The display 14 does not need to be provided. In this case, output of the processing circuit 24 is preferably recorded in a memory 26, displayed on a display provided outside the wide-field imaging apparatus 12, or recorded in a memory provided outside the wide-field imaging apparatus 12.

An image output from the processing circuit 24 may be displayed on a display located at a position distant from the wide-field imaging apparatus 12 by communication by a communication function.

Figure 2:
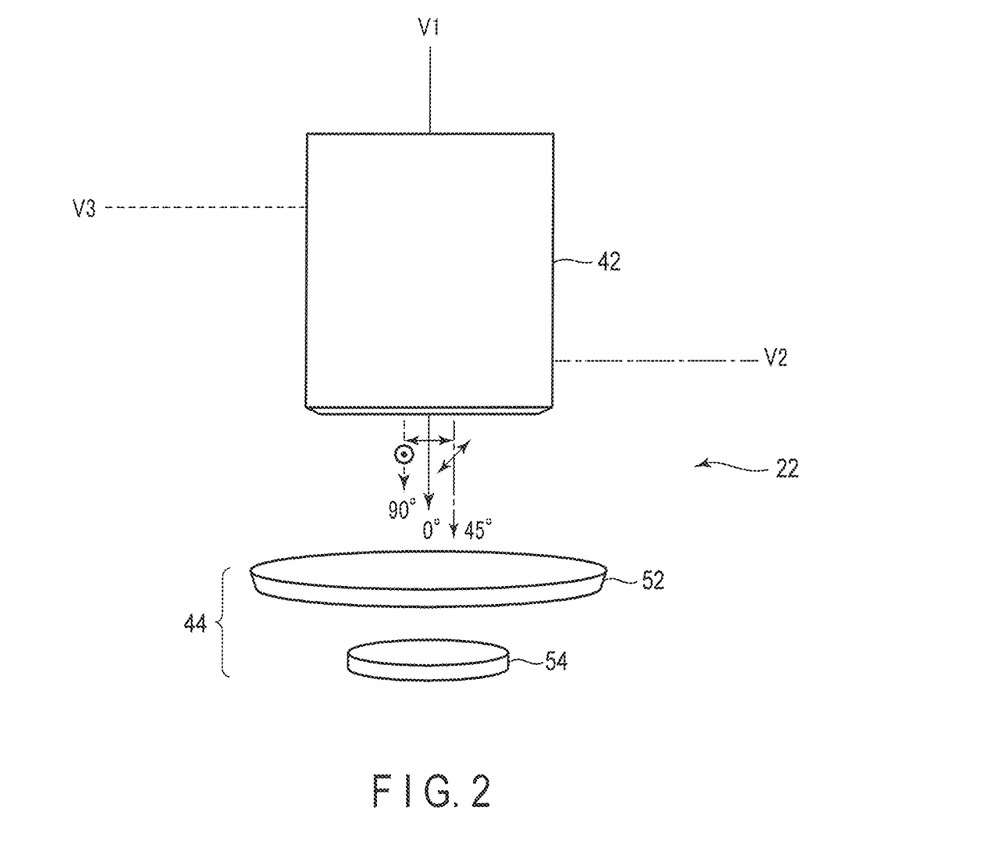
FIG. 2 is a schematic view showing an optical apparatus of a wide-field imaging apparatus according to the first embodiment as viewed from an upper side.

As shown in FIG. 2, the optical apparatus 22 according to the present embodiment includes a multi-view optical system (hereinafter, mainly referred to as a polarization separation optical system) 42 and a polarization camera 44. The polarization camera 44 includes an imaging lens 52 configured to image a light beam coming from the polarization separation optical system 42, and the polarization area sensor 54 configured to capture an image formed by the imaging lens 52. The polarization area sensor 54 includes, for example, a photoelectric conversion circuit. In the present embodiment, as an example, the polarization separation optical system 42, the imaging lens 52, and the polarization area sensor 54 are coaxial.

The polarization separation optical system 42 is used to guide different polarization components from light from each visual field in a predetermined direction when light beams coming from a plurality of visual fields are incident. The imaging lens 52 is disposed in a predetermined direction with respect to the polarization separation optical system 42, and is disposed at a position where a first polarization component and a second polarization component are directed from the polarization separation optical system 42. The imaging lens 52 images the first polarization component and the second polarization component on the polarization area sensor 54. The polarization area sensor 54 is configured to acquire the first polarization component and the second polarization component imaged through the imaging lens 52 at each pixel.

In the present embodiment, an example where the polarization separation optical system 42 is used to separate different polarization components from light beams coming from three visual fields V1, V2, V3, and guide them in a predetermined direction in which the imaging lens 52 and the polarization area sensor 54 are disposed.

In the present embodiment, the first visual field V1 includes optical axes of the imaging lens 52 and the polarization area sensor 54. The first visual field V1 is in a front direction as viewed from the polarization camera 44 in the present embodiment. The second visual field V2 is in a right side direction as viewed from the polarization camera 44 in the present embodiment. The third visual field V3 is in a left side direction as viewed from the polarization camera 44 in the present embodiment.

The second visual field V2 may be in the left side direction as viewed from the polarization camera 44, and the third visual field V3 may be in the right side direction as viewed from the polarization camera 44. For this reason, the left and right of the polarization separation optical system 42 of the present embodiment may be switched.

The first visual field V1 and the second visual field V2 preferably partially overlap each other. The first visual field V1 and the third visual field V3 are preferably adjacent and continuous. The first visual field V1 and the third visual field V3 preferably partially overlap each other. The second visual field V2 and the third visual field. V3 preferably do not overlap. When the second visual field V2, the first visual field V1, and the third visual field V3 are combined, a continuous viewing angle of a range over 180° is obtained.

The polarization separation optical system 42 extracts a linear polarization component (a first polarization component) of, for example, 0° from a first light beam coming from the first visual field V1 including polarization components in all directions. When the first light beam coming from the first visual field V1 is incident on the polarization separation optical system 42, the polarization separation optical system 42 allows linearly polarized light of, for example, 0° from the first light beam coming from the first visual field V1 to pass through, and cuts off transmission of the polarization components at other angles.

The polarization separation optical system 42 extracts a linear polarization component (a second polarization component different from the first polarization component) of, for example, 45° from a second light beam (including polarization components in all directions) coming from the second visual field V2 adjacent to the first visual field V1. When the second light beam coming from the second visual field V2 is incident on the polarization separation optical system 42, the polarization separation optical system 42 allows linearly polarized light of, for example, 45° from the second light beam coming from the second visual field V2 to pass through, and cuts off transmission of the polarization components at other angles.

The polarization separation optical system 42 includes an optical element configured to direct, in a predetermined direction, the first polarization component of the light beam coming from the first visual field V1 and the second polarization component, which is different from the first polarization component, of the light beam coming from the second visual field V2 different from the first visual field V1.

The polarization separation optical system 42 extracts a linear polarization component (a third polarization component different from the first polarization component and the second polarization component) of, for example, 90° from a third light beam (including polarization components in all directions) coming from the third visual field V3 distant from the second visual field V2 and adjacent to the first visual field V1. When the third light beam coming from the third visual field V3 is incident on the polarization separation optical system 42, the polarization separation optical system 42 allows linearly polarized light of, for example, 90° from the third light beam coming from the third visual field V3 to pass through, and cuts off transmission of the polarization components at other angles.

The optical element of the polarization separation optical system 42 is configured to direct, in a predetermined direction, the third polarization component, which is different from the first polarization component and also different from the second polarization component, of the light beam coming from the third visual field V3 different from the first visual field V1 and the second visual field V2.

The polarization separation optical system 42 guides, in a predetermined direction, a 0° linear polarization component separated from the first light beam coming from the first visual field V1, a 45° linear polarization component separated from the second light beam coming from the second visual field V2, and a 90° linear polarization component separated from the third light beam coming from the third visual field V3. As described above, the polarization separation optical system 42 separates different polarization components from light beams coming from three of the visual fields V1, V2, V3, and guides them in a predetermined direction. The polarization separation optical system 42 guides each polarization component passing through the polarization separation optical system 42 to the common imaging lens 52 and polarization area sensor 54. Different polarization components guided by the polarization separation optical system 42 are imaged on the polarization area sensor 54 through the imaging lens 52.

The linearly polarized light of 45° separated from the second visual field V2 is not actually along the linearly polarized light of 0° separated from the first visual field V1 on the same plane. In FIG. 2, the linearly polarized light of 0° and linearly polarized light of 45° are drawn on the same plane for convenience.

In the present embodiment, as an example of the polarization area sensor 54, one in which a total of four pixels, at which polarization component data of polarization angles 0°, 45°, 90°, and 135° can be acquired, are used as one set is used. In the present embodiment, the polarization area sensor 54 is configured to capture the polarization components of 0°, 45°, and 90° from three of the visual fields V1, V2, and V3 passing through the polarization separation optical system 42 at the above-described set of pixels. Therefore, the polarization area sensor 54 can acquire captured image data for each polarization component in each set. The polarization area sensor 54 preferably includes an effective number of pixels, such as several million pixels. As the polarization area sensor 54, IMX250MZR manufactured by SONY is used as an example.

As described above, the optical apparatus 22 can separate the first polarization component (0°) by the polarization separation optical system 42 from the first light beam coming from the first visual field V1, can image the component passing through the imaging lens 52 on the polarization area sensor 54, and can acquire the first polarization component of a polarization angle at 0° by the polarization area sensor 54. The optical apparatus 22 can separate the second polarization component (45°) by the polarization separation optical system 42 from the second light beam coming from the second visual field V2, can image the component passing through the imaging lens 52 on the polarization area sensor 54, and can acquire the second polarization component of a polarization angle at 45° by the polarization area sensor 54. The optical apparatus 22 can separate the third polarization component (90°) by the polarization separation optical system 42 from the third light beam coming from the third visual field V3, can image the component passing through the imaging lens 52 on the polarization area sensor 54, and can acquire the third polarization component of a polarization angle at 90° by the polarization area sensor 54. For this reason, The optical apparatus 22 can obtains data of images of the first polarization component, the second polarization component, and the third polarization component by the polarization area sensor 54. As described above, according to the present embodiment, the multi-view optical system 42 and the optical apparatus 22 including the multi-view optical system 42 configured to obtain a wide-field image by a method completely different from one that uses a fisheye lens are provided.

One or a plurality of the processing circuits 24 of the wide-field imaging apparatus 12 are configured to obtain images of two or more visual fields by performing a predetermined operation on data of the first polarization component and the second polarization component acquired by the polarization area sensor 54. The predetermined operation is, as an example, inverse matrix operation configured to calculate image data of an image in consideration of intensities of light from two or more visual fields based on intensity data of the first polarization component and the second polarization component acquired by the polarization area sensor 54.

The processing circuit (controller) 24 of the wide-field imaging apparatus 12 is, for example, an integrated circuit, such as a central processing unit (CPU) or an application specific integrated circuit (ASIC). A general purpose computer may be used as the processing circuit 24. The processing circuit 24 is not limited to one provided as a dedicated circuit, and may be provided as a program executed by a computer. In this case, the program is stored in a storage area in the integrated circuit, the memory 26, or the like. The processing circuit 24 is connected to the polarization area sensor 54 and the memory 26. The processing circuit 24 acquires acquired data in the polarization area sensor 54 by the acquisition function 32 and performs operation of multiplying with an appropriate coefficient or the like using the calculation function 34 based on the acquired data, so as to calculate the image data.

Here, the intensity of each polarization component acquired at four pixels as one set by the polarization area sensor 54 is $I_0$, $I_{45}$, $I_{90}$, and $I_{135}$ for each polarization component. The acquisition function 32 of the processing circuit 24 acquires from the polarization area sensor 54 the intensities $I_0$, $I_{45}$, $I_{90}$, and $I_{135}$ of each polarization component acquired by the polarization area sensor 54 in accordance with an acquisition signal for a still image and moving images described later. Here, the subscript represents an angle of polarization.

The processing circuit 24 is configured to acquire acquired data at the polarization area sensor 54. The processing circuit 24 is configured to generate image data based on the acquired data for each polarization component acquired by the polarization area sensor 54. The processing circuit 24 can output the image data for each polarization component acquired by the polarization area sensor 54 to the display 14, and can display the image data on the display 14 (see FIG. 6).

Let $S_1$, $S_2$, and $S_3$ be the intensities of the respective light beams for the respective visual fields V1, V2, and V3. These satisfy the following relationship:

[Equation 1]

$$\begin{bmatrix} I_0 \\ I_{45} \\ I_{90} \\ I_{135} \end{bmatrix} = \begin{bmatrix} A & B & C & 0 \\ D & E & F & 0 \\ G & H & I & 0 \\ 0 & 0 & 0 & 1 \end{bmatrix} \begin{bmatrix} S_1 \\ S_2 \\ S_3 \\ I_0 + I_{45} - I_{90} \end{bmatrix} \quad (1)$$

is established. By performing inverse matrix operation,

[Equation 2]

$$\begin{bmatrix} S_1 \\ S_2 \\ S_3 \end{bmatrix} = \begin{bmatrix} A & B & C \\ D & E & F \\ G & H & J \end{bmatrix}^{-1} \begin{bmatrix} I_0 \\ I_{45} \\ I_{90} \end{bmatrix} \quad (2)$$

is established. That is, the processing circuit 24 can respectively calculate image data $S_1$, $S_2$, and $S_3$ in consideration of the light intensities from the original visual fields V1, V2, and V3, based on signals (data $I_0$, $I_{45}$, and $I_{90}$ indicating the intensities of polarization components) acquired by the polarization area sensor 54. Thereby, the wide-field imaging apparatus 12 can acquire the image data $S_1$, $S_2$, and $S_3$ of the respective visual fields V1, V2, and V3 according to the light intensities of the respective visual fields V1, V2, and V3.

The memory 26 stores the above-described equation (2). The memory 26 stores, for example, an output (image data or the like) of the processing circuit 24. The memory 26 may store the output (acquired data) of the polarization area sensor 54. The memory 26 is, for example, a non-volatile memory, such as a flash memory. However, the memory 26 may be a storage apparatus, such as a hard disk drive (HDD), a solid state drive (SSD), an integrated circuit storage apparatus, or the like, and may further include a volatile memory.

Figure 3A:
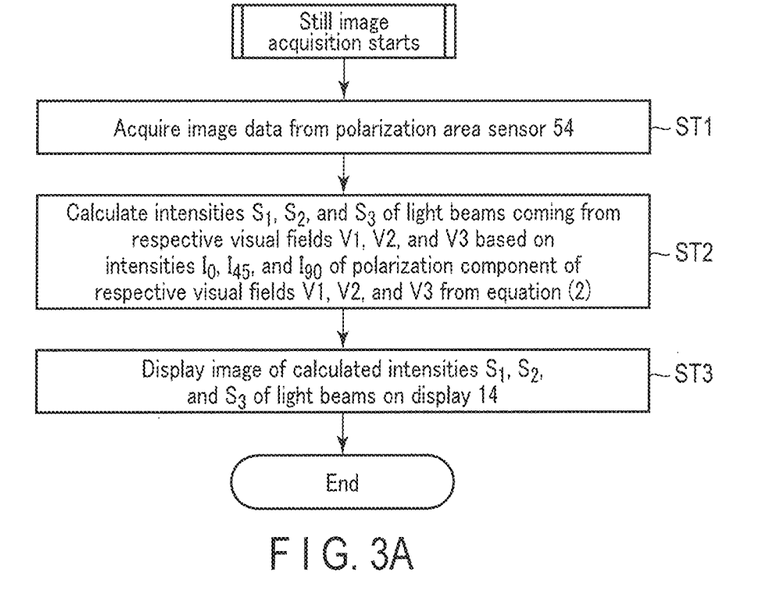
FIG. 3A is a schematic flowchart when a still image is captured using the wide-field imaging apparatus.
Figure 3B:
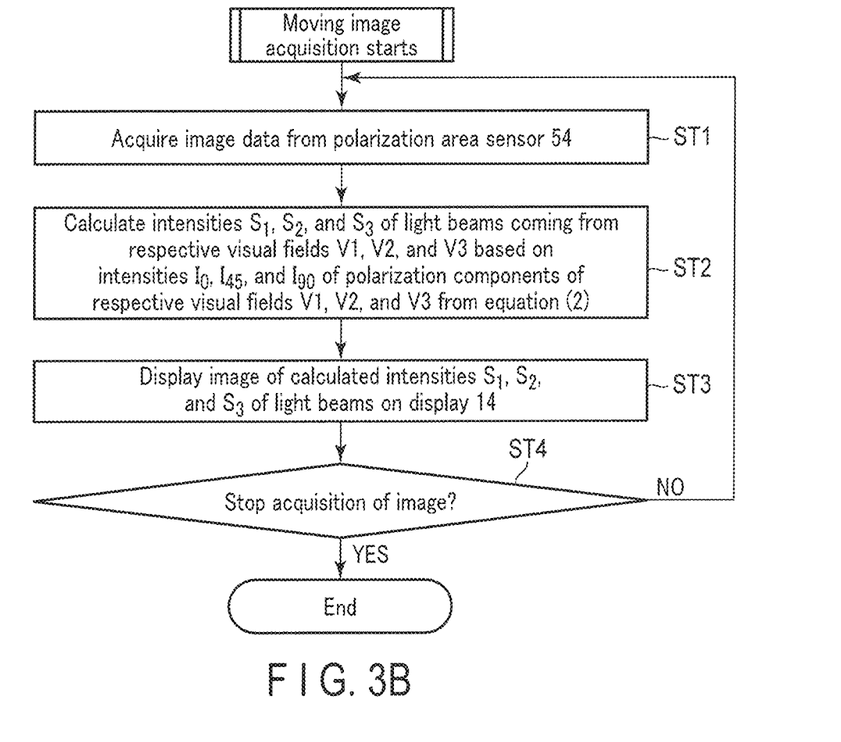
FIG. 3B is a schematic flowchart when moving images are captured using the wide-field imaging apparatus.

Here, flowcharts in a case of capturing a still image and moving images using the wide-field imaging apparatus 12 will be briefly described with reference to FIGS. 3A and 3B. The processing circuit (one or a plurality of processors) 24 is connected to the polarization area sensor 54 in a wired or wireless manner. The polarization area sensor 54 is controlled by the processing circuit 24.

The processing circuit 24 can perform processing below by using the calculation function 34 before displaying image data of each polarization component acquired from the polarization area sensor 54 on the display 14. The processing circuit 24 may display an image based on data acquired by the polarization area sensor 54 on the display 14 directly. The processing circuit 24 may display an image based on image data calculated using the calculation function 34 on the display 14.

In a case where the processing circuit 24 performs the processing below by using the calculation function 34, the processing circuit 24 acquires the acquired data acquired by the polarization area sensor 54 by the acquisition function 32, and executes operation of Equation (2) by the calculation function 34. In the calculation function 34, the processing circuit 24 performs predetermined operation based on the image data for each polarization component.

An example of capturing a still image will be described using the flowchart shown in FIG. 3A. For example, when a switch provided on the camera 44 or a wireless switch is operated by the user and a still image acquisition start signal configured to capture a still image is input to the processing circuit 24 of the wide-field imaging apparatus 12, the processing circuit 24 acquires acquired data (image data) from the polarization area sensor 54 by using the acquisition function 32 of the processing circuit 24 (ST1). Here, the processing circuit 24 acquires, from the polarization area sensor 54, the intensities $I_0$, $I_{45}$, $I_{90}$, and Ins of not only polarization components of 0°, 45°, and 90°, but also of a polarization component of 135°. In the present embodiment, since the polarization component of 135° is not extracted through the polarization separation optical system 42, the polarization area sensor 54 acquires reference example data.

The processing circuit 24 calculates the image data $S_1$, $S_2$, and $S_3$ according to the intensities of light beams coming from the visual field V1, V2, and V3 from Equation (2) stored in the memory 26 by using the calculation function 34 based on the data of the intensities $I_0$, $I_{45}$, and $I_{90}$ of the polarization components acquired from the polarization area sensor 54 using the acquisition function 32. The processing circuit 24 generates an image based on the image data $S_1$, $S_2$, and $S_3$ according to the calculated intensities of the respective light beams coming from the respective visual fields V1, V2, and V3 (ST2). Details will be described, for example, in the second embodiment. The inverse matrix operation of Equation (2) described above merely multiplies the data of the intensities $I_0$, $I_{45}$, and $I_{90}$ of the polarization components by a coefficient, and does not perform complicated processing. For this reason, processing time of the processing circuit 24 using the calculation function 34 may also be short.

Then, the processing circuit 24 sends image data generated based on the image data $S_1$, $S_2$, and $S_3$ corresponding to the intensities of light beams coming from the respective visual fields V1, V2, and V3 calculated using the calculation function 34 to the display 14, and causes the generated image to be displayed on the display 14 (ST3). In a case where the generated image data is sent to the display 14, data that is compressed by an appropriate compression technique is preferably transmitted to the display 14. Preferably, the image data displayed on the display 14 is stored in the memory 26.

In a case where, in addition to capturing of a single still image, for example, what is called continuous shooting, in which a plurality of times of shooting is performed per second, is performed, a series of pieces of processing of ST1, ST2, and ST3 described above are repeated at an appropriate speed.

In the present embodiment, the polarization area sensor 54 acquires image data of the visual fields V1, V2, and V3 simultaneously. For this reason, special synchronization adjustment is not necessary even if the camera 44 is used to capture an image of three of the visual fields V1, V2, and V3 at high speed, for example, more than 100 frames per second.

In the present embodiment, the polarization separation optical system 42 separates the polarization components from the light beams coming from the visual fields V1, V2, and V3, and the polarization area sensor 54 separates the image based on each of the polarization components, so as to obtain images of the visual fields V1, V2, and V3. By using, for example, a color RGB area sensor as the polarization area sensor 54, color information of all the visual fields V1, V2, and V3 can be obtained without loss.

Next, an example of capturing moving images will be described using the flowchart shown in FIG. 3B. For example, when the switch provided on the camera 44 or the wireless switch is operated by the user, and a moving image acquisition start signal configured to capture moving images is input to the processing circuit 24 of the wide-field imaging apparatus 12, the processing circuit 24 performs the processing of ST1, ST2, and ST3 described above. In a case where an image is generated, data may be compressed using an appropriate compression technique and transmitted to the display 14, so as to be displayed on the display 14. Moving images are obtained as such work is performed repeatedly at appropriate time intervals. The processing circuit 24 repeats the above-described flow until a signal for ending capturing of moving images is input to the processing circuit 24 (ST4). The moving image data displayed on the display 14 is preferably stored in the memory 26.

In addition to being stored in the memory 26, a still image and moving images are also preferably stored in a storage apparatus, such as an appropriate storage, via a network.

According to the present embodiment, the wide-field imaging apparatus 12 can obtain a wide-field image by a method completely different from one that uses a fisheye lens is provided.

By separating polarization components into an appropriate number (the number of visual fields) using the polarization separation optical system 42 according to the present embodiment, the camera 44 capable of capturing polarization components can capture images from light beams coming from a plurality of directions in a wide angle. Then, in this case, by using the wide-field imaging apparatus 12, a desired image can be obtained in a short time by calculation of a simple equation (Equation (2)).

The processing circuit 24 may be provided outside the wide-field imaging apparatus 12. The processing of the processing circuit 24 may be executed by a predetermined server. Acquired data of the polarization area sensor 54 is preferably output to the outside of the wide-field imaging apparatus 12 or recorded in the memory 26. That is, output and calculation of the acquired data of the polarization area sensor 54 may be performed inside the wide-field imaging apparatus 12 or may be performed outside.

In the optical apparatus, the polarization separation optical system 42 does not require electric energy. Therefore, operation time of the polarization camera 44 can be made as long as possible.

Here, the polarization separation optical system 42 separates a linear polarization component of 0° from the first visual field V1, a linear polarization component of 45° from the second visual field V2, and a polarization component of 90° from the third visual field V3, and guides them to the imaging lens 52. A combination of the polarization components and the visual fields V1, V2, and V3 is not limited to the above. For example, the polarization separation optical system 42 may separate the polarization component of 90° from the second visual field V2 and separate the polarization component of 45° from the third visual field V3.

The polarization area sensor 54 according to the present embodiment can acquire linearly polarized light at 135°, in addition to that at 0°, 45°, and 90°. For this reason, images of four visual fields V1, V2, V3, and V4 can be obtained by separating the images from the four visual fields V1, V2, V3, and V4 into four different linear polarization components (0°, 45°, 90°, and 135°) using the polarization separation optical system 42. If the polarization area sensor 54 is further formed so as to be able to acquire polarization components of different angles, it is possible to obtain images of more visual fields.

The optical apparatus 22 according to the present embodiment can be attached to appropriate moving bodies 82, 84, and 86 (see FIGS. 4A to 4C) and used. According to the present embodiment, the moving bodies 82, 84, and 86 including the wide-field imaging apparatus 12 configured to obtain a wide-field image by a method completely different from one that uses a fisheye lens are provided. Hereinafter, an example, in which an automobile is used as a moving body as a first application (see FIG. 4A), a ship is used as a moving body as a second application (see FIG. 4B), and a flying object, such as an airplane, is used as a moving body as a third application (see FIG. 4C), will be described. The moving bodies 82, 84, and 86 of the first to third applications are configured to be stoppable and movable.

(First Application)

Figure 4A:
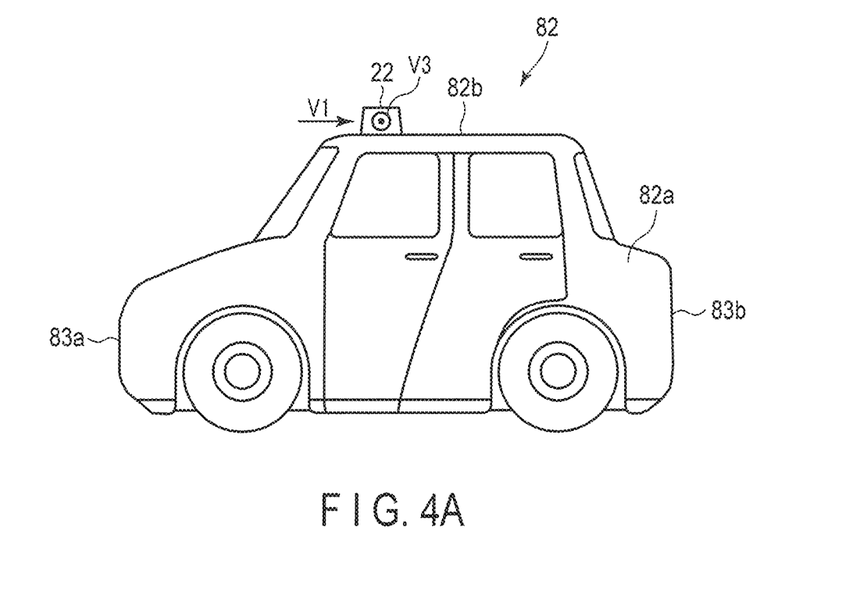
FIG. 4A is a schematic view showing an automobile as a moving body in which the wide-field imaging apparatus according to the first embodiment is attached to a body.

As shown in FIG. 4A, the moving body 82 includes a body 82a and the wide-field imaging apparatus 12 or the optical apparatus 22. The wide-field imaging apparatus 12 or the optical apparatus 22 is used by being attached to the body 82a of the moving body 82, such as an automobile. In this case, the optical apparatus 22 shown in FIG. 2 is fixed to a top surface (upper surface) 82b of the roof of the body 82a as an example.

A front direction, a rear direction, a right side direction, and a left side direction may be defined for the body 82a of the moving body 82. In this case, an image can be obtained by the camera 44 from predetermined polarization components in the front direction of the moving body 82 in the first visual field V1, in the right side direction of the moving body 82 in the second visual field V2, and in the left side direction of the moving body 82 in the third visual field V3.

The optical apparatus 22 may be disposed on a front bumper 83a or a rear bumper 83b of the body 82a of the moving body 82. The optical apparatus 22 may also be disposed in the vehicle (in the body 82a) such that the first light beam from the outside through a windshield and the first light beam from the outside through a rear glass are obtained as the first visual field V1.

In a case where the optical apparatus 22 is attached to, for example, the front bumper 83a of the body 82a of the moving body 82, the optical apparatus 22 is used to detect a person, an automobile, and the like heading for the moving body 82 from the right and left directions. In this case, as described in the first embodiment, an image from the first visual field V1 facing the camera 44 may be observed, which may be unnecessary. In this case, the visual fields V2 and V3 do not have to be continuous. That is, the polarization separation optical system 42 of the optical apparatus 22 does not necessarily have to separate three polarization components, and may be configured to separate two polarization components different from each other. In a case where the polarization separation optical system 42 separates two polarization components different from each other, a linear polarization component of 0° and a linear polarization component of 90° are preferably used as the polarization components.

Therefore, the multi-view optical system (polarization separation optical system) according to the first embodiment preferably includes the optical element configured to direct, in a predetermined direction, the first polarization component of the light beam coming from the first visual field V1 and the second polarization component, which is different from the first polarization component, of the light beam coming from the second visual field V2 different from the first visual field V1. The above similarly applies to second to fifth embodiments described later.

(Second Application)

Figure 4B:
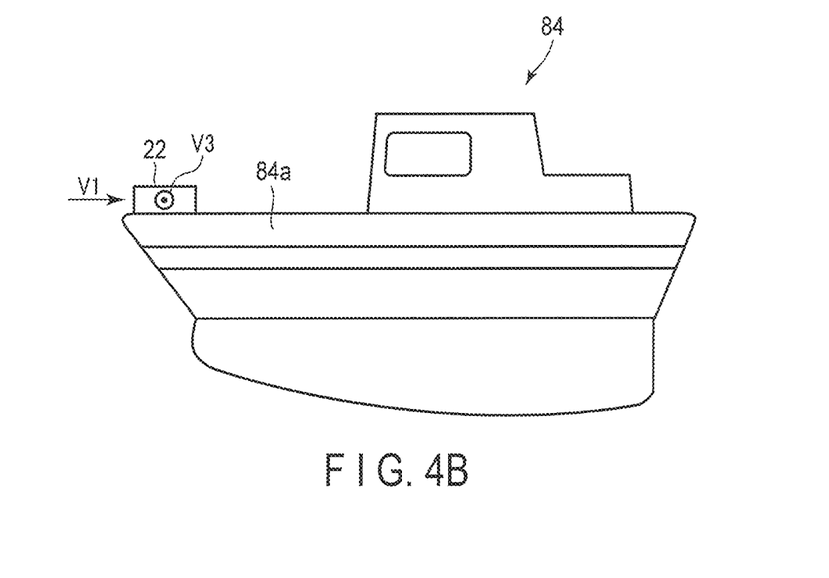
FIG. 4B is a schematic view showing a ship as a moving body in which the wide-field imaging apparatus according to the first embodiment is attached to a body.

As shown in FIG. 4B, the moving body 84 includes a body 84a and the wide-field imaging apparatus 12 or the optical apparatus 22. The wide-field imaging apparatus 12 or the optical apparatus 22 is used by being attached to the body 84a of the moving body 84 moving on the sea, such as a ship. The optical apparatus 22 can be attached to the bow, stern, or any other suitable positions of the body 84a of the moving body 84 and used. The wide-field imaging apparatus 12 or the optical apparatus 22 may be used for a submarine (moving body) capable of moving in the sea or the like, in addition to a ship moving on the sea.

(Third Application)

Figure 4C:
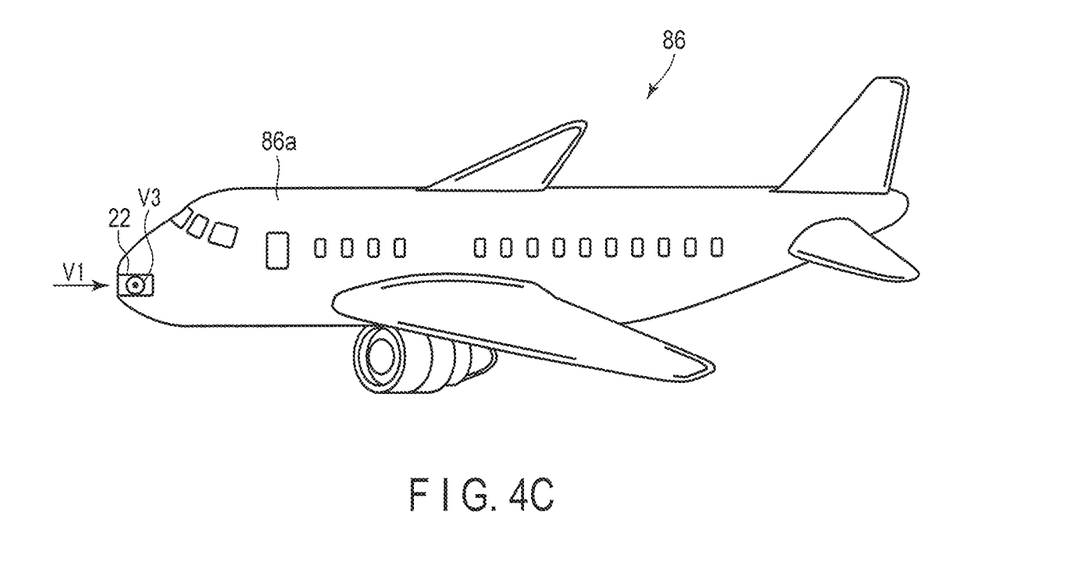
FIG. 4C is a schematic view showing an aircraft as a moving body in which the wide-field imaging apparatus according to the first embodiment is attached to a body.

As shown in FIG. 4C, the moving body 86 includes the body 86a and the wide-field imaging apparatus 12 or the optical apparatus 22. As shown in FIG. 4C, the wide-field imaging apparatus 12 or the optical apparatus 22 is used by being attached to the body 86a of a moving body 86 such as an aircraft (including a drone such as a drone). The optical apparatus 22 can be attached to, for example, the nose, cockpit, or any other suitable positions of an aircraft. The moving body 86 here also includes a spacecraft.

Second Embodiment

Next, the second embodiment will be described by using FIGS. 5 and 6. The present embodiment is a modification of the first embodiment, and the same members, or members having the same functions, as the members described in the first embodiment are denoted by the same reference numerals as much as possible, and the detailed description of such members is omitted. The above similarly applies to the third to fifth embodiments described later.

The wide-field imaging apparatus 12 or the optical apparatus 22 according to the present embodiment can be appropriately used in the above-described first to third applications. The above similarly applies to the third to fifth embodiments described later.

Here, the polarization separation optical system 42 of the optical apparatus 22, which is a portion different from the optical apparatus 22 described in the first embodiment, will be mainly described. The optical apparatus 22 of the present embodiment is used for the wide-field imaging apparatus 12 and the wide-field imaging system 10 of FIG. 1 like the one described in the first embodiment.

Figure 5:
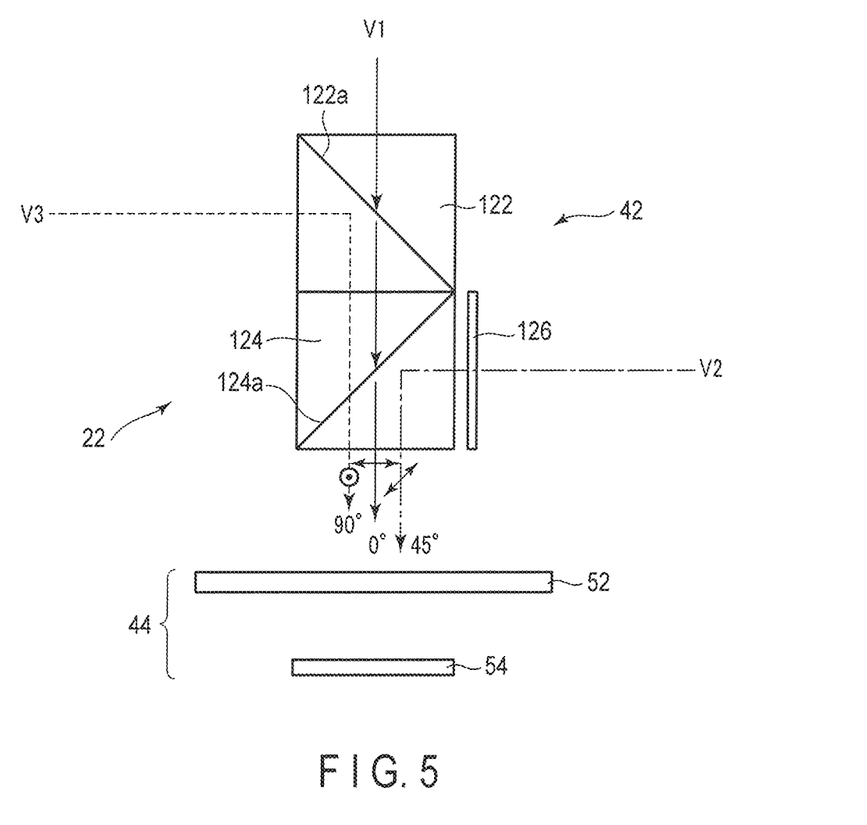
FIG. 5 is a schematic view showing an optical apparatus of the wide-field imaging apparatus according to the second embodiment as viewed from an upper side.

As shown in FIG. 5, the optical apparatus 22 according to the present embodiment includes the polarization separation optical system 42 including an optical element, the imaging lens 52, and the polarization area sensor 54.

Here, as explained in the first embodiment, the front side of the imaging lens 52 of the optical apparatus 22 is taken as the first visual field V1, the right side of the imaging lens 52 is taken as the second visual field V2, and the left side of the imaging lens 52 is taken as the third visual field V3. The first visual field V1 and the second visual field V2 are preferably adjacent and continuous. The first visual field V1 and the second visual field V2 preferably partially overlap each other. The first visual field V1 and the third visual field V3 are preferably adjacent and continuous. The first visual field V1 and the third visual field V3 preferably partially overlap each other. The second visual field V2 and the third visual field V3 preferably do not overlap. When the second visual field V2, the first visual field V1, and the third visual field V3 are combined, a continuous viewing angle of a range over 180° is obtained.

The polarization separation optical system 42 includes a polarization beam splitter (PBS) cube 122, a non-polarization beam splitter (NPBS) cube 124, and a linear polarization plate (polarizer) 126 as optical elements. The PBS cube 122 is a polarization optical element. The PBS cube 122 and the NPBS cube 124 are in front of the imaging lens 52. The PBS cube 122 is more distal to the imaging lens 52 than the NPBS cube 124. The linear polarization plate 126 may be in front of the imaging lens 52 or may be at a position offset from the front.

If the imaging lens 52 and the polarization area sensor 54 each have a plane, a transmitting/reflecting surface 122a of the PBS cube 122 is inclined at an angle of +(plus) 45° with respect to the plane. The PBS cube 122 transmits linearly polarized light of 0° (P-polarized light) of the first light beams coming from the first visual field V1 at an appropriate transmittance b. The PBS cube 122 reflects linearly polarized light of 90° (S-polarized light) of the third light beams coming from the third visual field V3 at an appropriate reflectance c.

If the imaging lens 52 and the polarization area sensor 54 each have a plane, a transmitting/reflecting surface 124a of the NPBS cube 124 is inclined at an angle of −(minus) 45° with respect to the plane. The NPBS cube 124 transmits linearly polarized light of 0° passing through the PBS cube 122 at an appropriate transmittance $a_1$ among the first light beams coming from the first visual field V1, and linearly polarized light of 90° passing through the PBS cube 122 at the appropriate transmittance $a_1$ among the third light beams coming from the third visual field V3.

The transmitting/reflecting surface 122a of the PBS cube 122 and the transmitting/reflecting surface 124a of the NPBS cube 124 are in a relationship of about 90° with each other.

The linear polarization plate 126 transmits linearly polarized light of 45° among the second light beams coming from the second visual field V2 at an appropriate transmittance d. The transmitting/reflecting surface 124a of the NPBS cube 124 reflects linearly polarized light of 45° that has passed through the linear polarization plate 126 among the second light beams coming from the second visual field V2 at an appropriate reflectance $a_2$. The linear polarization plate 126 is one or a plurality of linear polarization elements that extract a linear polarization component in a specific direction from light passing through the linear polarization plate (polarization optical element) 126.

The linear polarization plate 126 is disposed to be inclined with respect to the NPBS cube 124 so that linearly polarized light of 45° passes.

The PBS cube 122 transmits part of linearly polarized light of 0° from the first beam coming from the first visual field V1. The PBS cube 122 reflects part of linearly polarized light of 90° from the third beam coming from the third visual field V3. The NPBS cube 124 is disposed at the point where the linearly polarized light of 0° is transmitted and the point where the linearly polarized light of 90° is reflected.

The NPBS cube 124 transmits linearly polarized light of 0° and linearly polarized light of 90° and directs them toward the imaging lens 52.

Here, the linear polarization plate 126 transmits linearly polarized light of 45° from the second light beam coming from the second visual field V2. The NPBS cube 124 is disposed at the point where the linearly polarized light is transmitted by the linear polarization plate 126. The NPBS cube 124 reflects part of the linearly polarized light of 45° and directs it toward the imaging lens 52.

As described above, the optical apparatus 22 can separate the first polarization component (0°) by the polarization separation optical system 42 from the first light beam coming from the first visual field V1, can image the component passing through the imaging lens 52 on the polarization area sensor 54, and can acquire a polarization component of a polarization angle at 0° by the polarization area sensor 54. The optical apparatus 22 can separate the second polarization component (45°) by the polarization separation optical system 42 from the second light beam coming from the second visual field V2, can image the component passing through the imaging lens 52 on the polarization area sensor 54, and can acquire a polarization component of a polarization angle at 45° by the polarization area sensor 54. The optical apparatus 22 can separate the third polarization component (90°) by the polarization separation optical system 42 from the third light beam coming from the third visual field V3, can image the component passing through the imaging lens 52 on the polarization area sensor 54, and can acquire a polarization component of a polarization angle at 90° by the polarization area sensor 54.

The intensities $I_0$, $I_{45}$, $I_{90}$, and $I_{ns}$ of polarization components acquired at a set of four pixels of the polarization area sensor 54, and the image data $S_1$, $S_2$, and $S_3$ considering the intensity of each light beam for the visual fields V1, V2, and V3 satisfy the following relationship: That is,

[Equation 3]

$$\begin{bmatrix} I_0 \\ I_{45} \\ I_{90} \\ I_{135} \end{bmatrix} = \begin{bmatrix} a_1 b & a_2 d/2 & 0 & 0 \\ a_1 b/2 & a_2 d & a_1 c/2 & 0 \\ 0 & a_2 d/2 & a_1 c & 0 \\ 0 & 0 & 0 & 1 \end{bmatrix} \begin{bmatrix} S_1 \\ S_2 \\ S_3 \\ I_0 + I_{45} - I_{90} \end{bmatrix} \quad (3)$$

is established. In the equation, $a_1$: transmittance of the NPBS cube 124, $a_2$: reflectance of the NPBS cube 124, b: transmittance of P-polarized light of the PBS cube 122, c: reflectance of S-polarized light of the PBS cube 122, and d: transmittance of the linear polarization plate 126. By performing inverse matrix operation,

[Equation 4]

$$\begin{bmatrix} S_1 \\ S_2 \\ S_3 \end{bmatrix} = \begin{bmatrix} 1/a_1 b & 0 & 0 \\ 0 & 1/a_2 d & 0 \\ 0 & 0 & 1/a_1 c \end{bmatrix} \begin{bmatrix} 3 & -2 & 1 \\ -2 & 4 & -2 \\ 1 & -2 & 3 \end{bmatrix} \begin{bmatrix} I_0 \\ I_{45} \\ I_{90} \end{bmatrix} \quad (4)$$

is established. That is, the processing circuit 24 can calculate the image data $S_1$, $S_2$, and $S_3$ considering the light intensities corresponding to the original visual fields V1, V2, and V3 from the signals (intensity data of polarization components) $I_0$, $I_{45}$, and $I_{90}$ that can be acquired by the polarization area sensor 54. Thereby, the wide-field imaging apparatus 12 can acquire images of the visual fields V1, V2, and V3 according to the light intensities of the respective visual fields V1, V2, and V3.

In the present embodiment, Equation (4) can be further modified to

[Equation 5]
$$\begin{bmatrix} a_1 b S_1 \\ a_1 d S_2 \\ a_1 c S_3 \end{bmatrix} = \begin{bmatrix} 3 & -2 & 1 \\ -2 & 4 & -2 \\ 1 & -2 & 3 \end{bmatrix} \begin{bmatrix} I_0 \\ I_{45} \\ I_{90} \end{bmatrix} \quad (5)$$

As can be seen from Equation (5), the right side does not depend on the performance of the polarizing elements (the PBS cube 122, the NPBS cube 124, and the linear polarizing plate 126). That is, the right side does not depend on the above-described $a_1$, $a_2$, b, c, and d. Meanwhile, the overall brightness of the visual fields V1, V2, and V3 depends on the intensities $I_0$, $I_{45}$, and $I_{90}$ of polarization components acquired by the polarization area sensor 54. From the above, the image data obtained from the light of the visual field V1, V2, and V3 captured by the polarization area sensor 54 is separated by the polarization separation optical system 42 regardless of the performance of the optical elements (the PBS cube 122, the NPBS cube 124, and the linear polarization plate 126). For this reason, the performance of the polarization separation optical system 42 does not depend on aging degradation of the optical elements (the NPBS cube 124, the PBS cube 122, and the linear polarization plate 126).

In the present embodiment, the memory 26 stores Equation (4) in place of Equation (2) described above. The flow in a case of capturing a still image and moving images is similar to that described with reference to FIGS. 3A and 3B.

In a case where the processing circuit 24 performs processing below by using the calculation function 34, the processing circuit 24 acquires an output from the polarization area sensor 54 by the acquisition function 32, and executes operation described later by the calculation function 34. In the calculation function 34, the processing circuit 24 performs predetermined operation (as an example, the inverse matrix operation described above) based on the image data for each polarization component.

By using the polarization separation optical system 42 according to the present embodiment, it is possible to obtain an image from light beams coming from a plurality of directions in a wide angle by the camera 44 configured to capture a polarization component. In this case, by using the wide-field imaging apparatus 12, an image of the image data $S_1$, $S_2$, and $S_3$ of a desired intensity in the visual fields V1, V2, and V3 can be obtained in a short time by calculation of a simple equation (Equation (4)).

The wide-field imaging apparatus 12 can calculate the image data $S_1$, $S_2$, and $S_3$ in consideration of the light intensities corresponding to the original visual fields V1, V2, and V3 from the intensity data $I_0$, $I_{45}$, and $I_{90}$ of polarization components configured to be acquired by the polarization area sensor 54. Thereby, the wide-field imaging apparatus 12 can acquire images of the visual fields V1, V2, and V3 according to the light intensities of the respective visual fields V1, V2, and V3.

Figure 6:
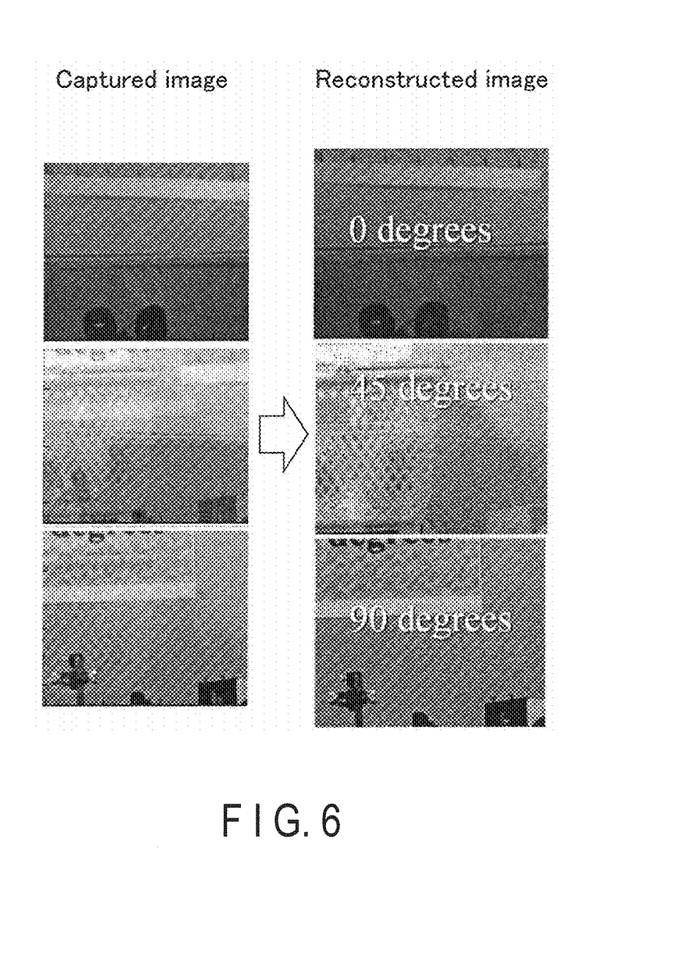
FIG. 6 is a schematic view showing a polarization image of image data acquired by the optical apparatus of the wide-field imaging apparatus according to the second embodiment, and a polarization image reconstructed by calculation of multiplying the acquired image data by a predetermined coefficient.

An image captured by the polarization area sensor 54 according to the present embodiment is shown on the left side (left diagram) in FIG. 6, and an image reconstructed by using the image captured by the polarization area sensor 54 is shown on the right side (right diagram) in FIG. 6.

The left diagram in FIG. 6 show captured images of the polarization area sensor 54 for polarization angles of 0°, 45°, and 90° arranged in this order from the top. An example of the polarization angle of 0° is an image in the direction of the first visual field V1 on which the acquired data acquired by the polarization area sensor 54 is displayed. An example of the polarization angle of 45° is an image in the direction of the second visual field V2 in which the acquired data acquired by the polarization area sensor 54 is displayed. An example of the polarization angle of 90° is an image in the direction of the third visual field V3 on which the acquired data acquired by the polarization area sensor 54 is displayed. It shows that, the image, particularly for the polarization angle of 45', in the left diagram in FIG. 6 is displayed in a manner that the polarization component of the polarization angle of 0° and the polarization component of the polarization angle of 90° overlap each other.

The right diagram in FIG. 6 is an image (referred to as a reconstructed image) showing the intensity data $S_1$, $S_2$, and $S_3$ of light beams for the respective visual fields V1, V2, and V3 obtained by converting the acquired data acquired by the polarization area sensor 54 by using Equation (4). The right diagram in FIG. 6 show reconstructed images for polarization angles of 0°, 45°, and 90° arranged in this order from the top. It shows that, in the reconstructed image, particularly for the polarization angle of 45°, in the right diagram in FIG. 6, the polarization component of the polarization angle of 0° and the polarization component of the polarization angle of 90° are removed.

In the present embodiment, a positional relationship between the optical elements (the NPBS cube 124, the PBS cube 122, and the linear polarization plate 126) of the polarization separation optical system 42 can be reliably maintained with high accuracy. That is, the polarization separation optical system 42 according to the present embodiment can be formed into a more robust configuration.

Third Embodiment

Next, the third embodiment will be described with reference to FIG. 7. Here, the optical apparatus 22, which is a portion different from that described in the first and second embodiments, will be mainly described. The optical apparatus 22 of the present embodiment is used for the system 10 of FIG. 1 in a similar manner as that described in the first and second embodiments.

Figure 7:
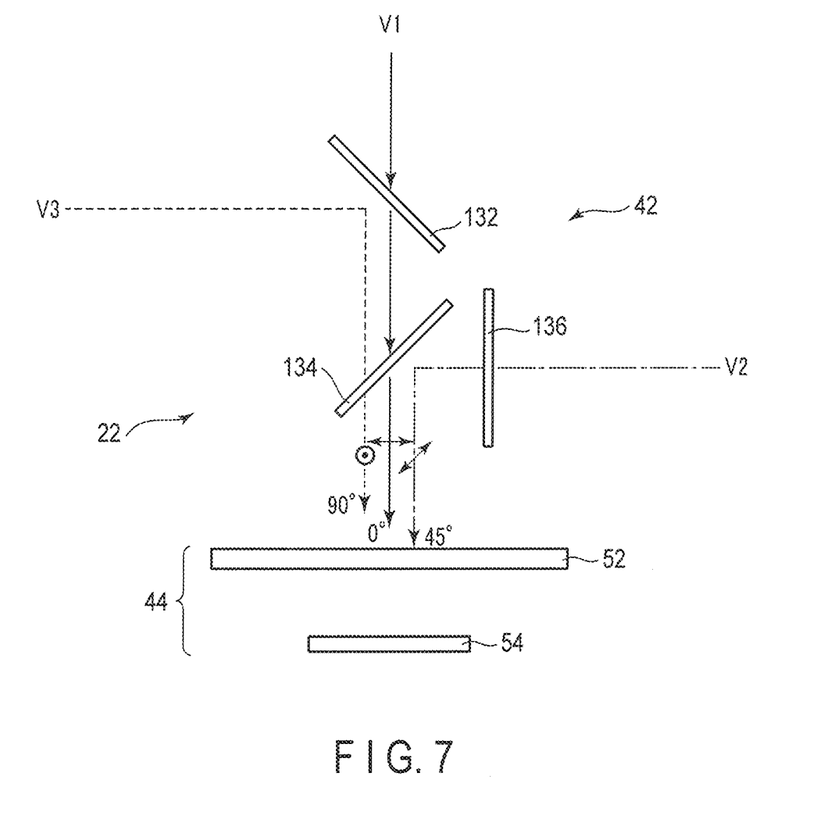
FIG. 7 is a schematic view showing the optical apparatus of the wide-field imaging apparatus according to the third embodiment as viewed from an upper side.

As shown in FIG. 7, the optical apparatus 22 according to the present embodiment includes the polarization separation optical system 42 and the polarization camera 44.

In the second embodiment, the example in which the polarization separation optical system 42 includes the PBS cube 122 and the NPBS cube 124 is described. In the present embodiment, as shown in FIG. 7, the polarization separation optical system 42 may use a plate-shaped polarization beam splitter (PBS) 132 instead of using the cube-shaped PBS cube 122. Instead of using the cube-shaped NPBS cube 124, the polarization separation optical system 42 may use a plate-shaped non-polarization beam splitter (NPBS) 134.

The PBS 132 and the NPBS 134 can preferably maintain an angle with respect to the imaging lens 52 and the polarization area sensor 54.

Fourth Embodiment

Next, the fourth embodiment will be described with reference to FIG. 8. Here, the optical apparatus 22, which is a portion different from that described in the first to third embodiments, will be mainly described. The optical apparatus 22 of the present embodiment is used for the system 10 of FIG. 1 in a similar manner as that described in the first to third embodiments.

Figure 8:
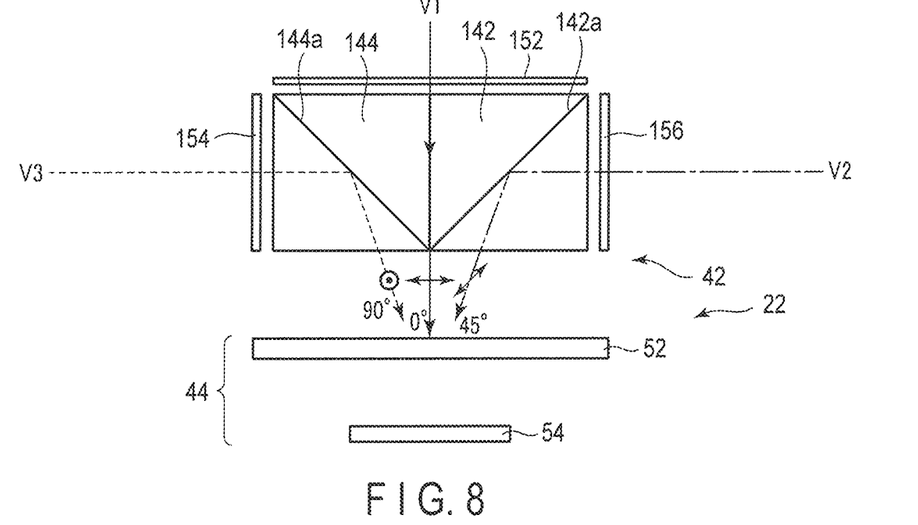
FIG. 8 is a schematic view showing the optical apparatus of the wide-field imaging apparatus according to the fourth embodiment as viewed from an upper side.

As shown in FIG. 8, the optical apparatus 22 according to the present embodiment includes the polarization separation optical system 42 and the polarization camera 44.

The polarization separation optical system 42 acquires one polarization component from each of different viewing angles and guides it to the imaging lens 52. The polarization separation optical system 42 acquires, for example, a linear polarization component of 0° from the first visual field V1, a linear polarization component of 45° from the second visual field V2, and a polarization component of 90° from the third visual field V3, and guides them to the imaging lens 52. However, the combination of the polarization components and the visual fields is not limited to the above. The polarization components corresponding to the visual fields are different from each other. In FIG. 8, linearly polarized light of 45° is not actually along the same plane as linearly polarized light of 0°. However, they are drawn on the same plane for convenience.

The description has been made on the example, in which the polarization separation optical system 42 according to the second embodiment includes the PBS cube 122 and the NPBS cube 124 as optical elements, and the polarization separation optical system 42 according to the third embodiment includes the PBS 132 and the NPBS 134 as optical elements, which are arranged along the optical axis of the first visual field V1. In the polarization separation optical system 42 according to the present embodiment, two half mirrors (or NPBS cubes) 142 and 144 as optical elements are juxtaposed perpendicularly to the optical axis of the first visual field V1.

The polarization separation optical system 42 includes, as optical elements, two of the half mirrors (or NPBS cubes) 142 and 144 and three linear polarization plates (linear polarizers) 152, 154, and 156. The three linear polarization plates (linear polarizers) 152, 154, and 156 of the polarization separation optical system 42 extract linear polarization components in a specific direction from light passing through the polarization optical element.

The first linear polarization plate 152 extracts a linear polarization component (first polarization component) of, for example, 0° from the first light beam coming from the first visual field V1. The first polarization component that has passed through the first linear polarization plate 152 is incident on two of the half mirrors 142 and 144.

The second linear polarization plate 154 extracts a linear polarization component (second polarization component) of, for example, 45° from a second light beam coming from the second visual field V2. The second polarization component that has passed through the second linear polarization plate 154 is incident on the half mirror 142.

The third linear polarization plate 156 extracts a linear polarization component (third polarization component) of, for example, 90° from a third light beam coming from the third visual field V3. The third polarization component that has passed through the third linear polarization plate 156 is incident on the half mirror 144.

The first half mirror 142 and the second half mirror 144 reflect part of the first polarization component of 0° and transmit the rest. Therefore, the first linearly polarized light of 0° that has passed through the first half mirror 142 and the second half mirror 144 is imaged by the imaging lens 52 and captured by the polarization area sensor 54.

The first half mirror 142 reflects part of the second polarization component of 45° that has passed through the second linear polarization plate 154 toward the imaging lens 52 and transmits the rest. The second half mirror 144 reflects part of the third polarization component of 90° that has passed through the third linear polarization plate 156 toward the imaging lens 52 and transmits the rest. The second linearly polarized light 45° reflected by the first half mirror 142 is imaged by the imaging lens 52 and captured by the polarization area sensor 54. The third linearly polarized light of 90° reflected by the second half mirror 144 is imaged by the imaging lens 52 and captured by the polarization area sensor 54.

For this reason, the polarization separation optical system 42 according to the present embodiment can separate polarization components into an appropriate number (the number of visual fields).

As described in the first to third embodiments, the optical apparatus 22 can simultaneously acquire images of three of the visual fields V1, V2, and V3.

Fifth Embodiment

Next, the fifth embodiment will be described with reference to FIG. 9. Here, the optical apparatus 22, which is a portion different from that described in the first to fourth embodiments, will be mainly described. The optical apparatus 22 of the present embodiment is used for the system 10 of FIG. 1 in a similar manner as that described in the first and fourth embodiments.

Figure 9:
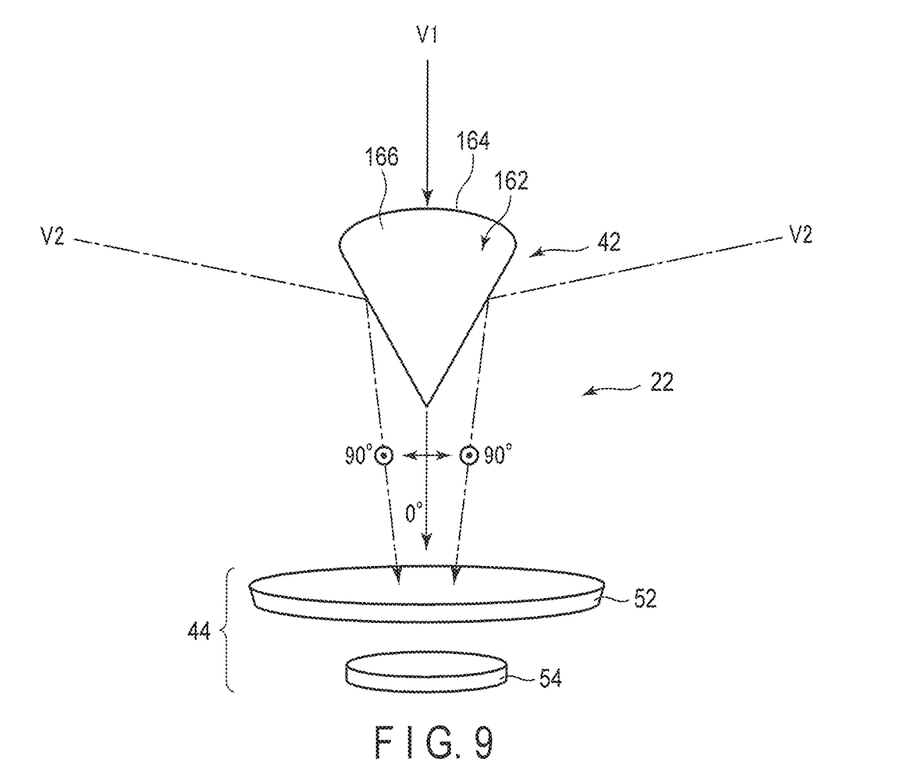
FIG. 9 is a schematic view showing the optical apparatus of the wide-field imaging apparatus according to the fifth embodiment as viewed from an upper side.

As shown in FIG. 9, the optical apparatus 22 according to the present embodiment includes the polarization separation optical system 42 and the polarization camera 44.

The polarization separation optical system 42 separates one polarization component from polarization components in all directions of different viewing angles and guides the polarization component to the imaging lens 52. For example, the linear polarization component of 0° is separated for the first visual field and the linear polarization component of 90° is separated for the second visual field, and guided to the imaging lens 52. However, the combination of the polarization components and the visual fields is not limited to the above. The polarization components corresponding to the visual fields are different from each other.

The polarization separation optical system 42 includes a polarization beam splitter (PBS) block 162. Here, the PBS block 162 of the polarization separation optical system 42 is formed in a conical or truncated cone shape. The PBS block 162 includes a bottom surface 164 on which light beams coming from the first visual field V1 are incident and a side surface 166 on which light beams coming from the second visual field V2 are incident. The side surface 166 of the polarization beam splitter (PBS) block 162 is curved. That is, the polarization separation optical system 42 includes a curved polarization beam splitter as an optical element.

Here, the content of the second visual field V2 is different from that in the first embodiment to the fourth embodiment. The second visual field V2 in the first to fourth embodiments is for capturing, by the polarization separation optical system 42, a light beam incident on a plane orthogonal to the first visual field V1. For the second visual field V2 in the present embodiment, a light beam coming from an annular region is captured annularly by the polarization separation optical system 42.

The second visual field V2 reflects part of the polarization component of 90° of the light beams coming from 360° of the side of the PBS block 162 toward the imaging lens 52.

For this reason, the polarization separation optical system 42 can separate the first polarization component of 0° and the second polarization component of 90° and direct them to the imaging lens 52.

With the above configuration, the polarization separation optical system 42 according to the present embodiment can guide the polarization component of 90° separated from the light beam coming from all directions or the visual field V2 which is close to all directions to the polarization area sensor 54.

The polarization separation optical system 42 of the present embodiment can capture a wide viewing angle with a small number of optical elements.

According to the first to fifth embodiments, the multi-view optical system 42, the optical apparatus 22, the imaging apparatus 12, and the moving body 82 configured to obtain a wide-field image is provided.

While certain examples have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multi-view optical system, comprising:
an optical element configured to simultaneously direct, in a predetermined direction, a first polarization component of a light beam coming from a first visual field, a second polarization component, which is different from the first polarization component, of a light beam coming from a second visual field including an object different from the first visual field, and a third polarization component, which is different from the first polarization component and the second polarization component, of a light beam coming from a third visual field including another object different from the first visual field and the second visual field.

2. The optical system according to claim 1, wherein the optical element includes a polarization optical element.

3. The optical system according to claim 2, wherein the polarization optical element includes a polarization beam splitter (PBS).

4. The optical system according to claim 2, wherein the polarization optical element is one or a plurality of linear polarization elements configured to extract a linear polarization component in a specific direction from light passing through the polarization optical element.

5. The optical system according to claim 4, wherein the linear polarization elements make light beams passing therethrough as polarization components in different directions.

6. The optical system according to claim 1, wherein the optical element includes a curved polarization beam splitter.

7. The optical system according to claim 1, wherein the optical element is configured to reflect at least one of the first polarization component and the second polarization component in the predetermined direction.

8. An optical apparatus, comprising:
a multi-view optical system according to claim 1;
an imaging lens disposed in the predetermined direction with respect to the multi-view optical system and disposed at a position to which the first polarization component, the second polarization component, and the third polarization component are directed from the multi-view optical system; and
a polarization area sensor in which the first polarization component, the second polarization component, and the third polarization component are imaged through the imaging lens, and the first polarization component, the second polarization component, and the third polarization component are configured to be simultaneously acquired at each pixel.

9. An imaging apparatus, comprising:
an optical apparatus according to claim 8; and
one or more processing circuits configured to obtain images of two or more visual fields by performing a predetermined operation on data of the first polarization component, the second polarization component, and the third polarization component acquired by the polarization area sensor.

10. The imaging apparatus according to claim 9, wherein the predetermined operation of the one or more processing circuits is inverse matrix operation configured to calculate image data in consideration of intensities of light from the two or more visual fields based on intensity data of the first polarization component, the second polarization component, and the third polarization component acquired by the polarization area sensor.

11. A moving body comprising an optical apparatus according to claim 8,
the moving body is configured to be stoppable and movable.

12. The optical apparatus according to claim 8, wherein the polarization area sensor is configured to simultaneously acquire the first polarization component, the second polarization component, and the third polarization component at each pixel without synchronization adjustment.

* * * * *